United States Patent
Inoue et al.

(10) Patent No.: US 10,941,812 B2
(45) Date of Patent: Mar. 9, 2021

(54) BEARING SEAL STRUCTURE, PULLEY, AND DESIGN METHOD OF BEARING SEAL

(71) Applicant: NTN CORPORATION, Osaka (JP)

(72) Inventors: Masaharu Inoue, Tokyo (JP); Shohei Fukama, Shizuoka (JP); Hayato Kawaguchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/612,849

(22) PCT Filed: May 10, 2018

(86) PCT No.: PCT/JP2018/018163
§ 371 (c)(1),
(2) Date: Nov. 12, 2019

(87) PCT Pub. No.: WO2018/216494
PCT Pub. Date: Nov. 29, 2018

(65) Prior Publication Data
US 2020/0200221 A1    Jun. 25, 2020

(30) Foreign Application Priority Data

May 23, 2017    (JP) .............................. JP2017-101676

(51) Int. Cl.
*F16C 33/78* (2006.01)
*F16J 15/3232* (2016.01)

(52) U.S. Cl.
CPC ........... *F16C 33/78* (2013.01); *F16J 15/3232* (2013.01)

(58) Field of Classification Search
CPC .... F16C 13/006; F16C 13/02; F16C 33/7816; F16C 33/782; F16C 33/7823; F16J 15/3232
See application file for complete search history.

(56) References Cited

U.S. PATENT DOCUMENTS

| | | | |
|---|---|---|---|
| 6,719,459 B1* | 4/2004 | Gotoh | F16C 33/418 384/482 |
| 7,775,721 B2* | 8/2010 | Gietl | F16C 33/7823 384/486 |
| 2006/0153484 A1* | 7/2006 | Ohata | F16C 33/7823 384/484 |
| 2006/0239599 A1* | 10/2006 | Schenk | F16C 33/7853 384/484 |

(Continued)

FOREIGN PATENT DOCUMENTS

| | | |
|---|---|---|
| JP | 2001-140907 | 5/2001 |
| JP | 2003-004055 | 1/2003 |
| JP | 2003-227521 | 8/2003 |

(Continued)

*Primary Examiner* — Phillip A Johnson
(74) *Attorney, Agent, or Firm* — Clark & Brody LP

(57) ABSTRACT

A bearing seal (26) includes an elastically deformable waist portion (29), a first lip (31) protruding axially inside direction, and a second lip (32) protruding axially outside. In a free situation without the fastening allowance C, a center of gravity F of a portion that includes the waist portion, the first lip, and the second lip is present in an axial inside with respect to a rotation center X of the portion, and an axial distance A from the rotation center X to the center of gravity F is included in a range of more than 0 and less than the fastening allowance C.

6 Claims, 6 Drawing Sheets

(56) References Cited

U.S. PATENT DOCUMENTS

2015/0247533 A1\* 9/2015 Fickert-Guenther ........................ F16C 33/7823
 384/480
2016/0363169 A1\* 12/2016 Tahara ................ F16C 33/7823

FOREIGN PATENT DOCUMENTS

| JP | 2005-054909 | 3/2005 |
|----|-------------|---------|
| JP | 2006-336734 | 12/2006 |
| JP | 2007-010147 | 1/2007 |
| JP | 2008-095939 | 4/2008 |
| JP | 2009-174683 | 8/2009 |
| JP | 2011-080497 | 4/2011 |

\* cited by examiner

BEARING SEAL STRUCTURE, PULLEY, AND DESIGN METHOD OF BEARING SEAL

TECHNICAL FIELD

The present invention relates to a bearing seal structure, a pulley bearing that includes the bearing seal structure, and a design method of a bearing seal.

BACKGROUND ART

As conventional arts in which a rolling bearing (sealed type rolling bearing) with a sealing plate that covers an annular gap between an outer ring of a bearing and an inner ring of the bearing is disclosed, for example, those described in Japanese Unexamined Patent Publication No. 2001-140907 (Patent Literature 1), Japanese Unexamined Patent Publication No. 2003-4055 (Patent Literature 2), and Japanese Unexamined Patent Publication No. 2003-227521 (Patent Literature 3) are known.

In Patent Literature 1, annular sealing plates are attached to both axial end portions of the outer ring. The sealing plate blocks an annular space of the inner ring and the outer ring from the outside, and prevents grease filled in the annular space from leaking outside. A seal lip is formed on the inner diameter edge of the sealing plate. A seal groove that receives the seal lip is formed in the inner ring. Since the bearing is used for a long period of time at a high rotation, grease sealing performance and durability are required for the sealing plate.

In Patent Literature 2, an annular seal ring is attached to the axial end portion of the outer ring. The seal ring includes a seal ring main body that includes a core metal and covers an annular gap between inner and outer rings, a lip waist that protrudes from the inner diameter edge of the seal ring main body to the inner diameter side, a dust lip that protrudes from the inner diameter edge of the lip waist to the axial outside, and a contact lip that protrudes from the inner diameter edge of the lip waist to the axial inside and comes into contact with the inner ring. In order to improve the balance of centrifugal force that acts on the dust lip and the contact lip, the volume and the radial position of the two lips are set so that the centrifugal force generated at the dust lip and the contact lip is substantially equal when the outer diameter edge of the seal ring is fixed to the groove of the outer ring, and the root of the lip waist and the inner diameter surface of the core metal are close to each other and the whole or most of them face each other.

In Patent Literature 3, an annular sealing device is attached to the axial end portion of the outer ring. A general bearing seal 101 is shown in FIG. 8 with reference to Patent Literatures 1 to 3. The bearing seal 101 includes, on an inner diameter edge of a main body 102, a waist portion 103 that protrudes to an inner diameter side, a main lip 104 that protrudes from an inner diameter edge of the waist portion 103 to an axis O direction inside and comes into contact with an inner ring 106, and a sub lip 105 that protrudes from the inner diameter edge of the waist portion 103 to the axis O direction outside. In a state where the bearing seal 101 is attached to an outer ring 107 of the bearing, the waist portion 103 of Patent Literature 3 is set in an orientation substantially perpendicular to the axis O that is the center of the bearing. As a result, even if centrifugal force when the outer ring 107 rotates acts on the bearing seal 101, force that tilts the waist portion 103 in the axis O direction is hardly generated.

Since the general bearing seal 101, including the sealing plate, the seal ring, and the sealing device of the patent documents described above, is attached to the outer ring 107 with a fastening allowance for fastening to the axis O direction inside, in other words, is attached to the outer ring 107 with elastic deformation, each of the lips 104 and 105 is relatively displaced to the axis O direction outside with the same displacement amount as the fastening allowance as viewed from the bearing seal 101. The main lip 104 gives the inner ring 106 a lip reaction force toward the axis O direction inside. As a result, the main lip 104 comes into contact with the inner ring 106 and seals an annular gap G between the inner ring 106 and the outer ring 107.

CITATION LIST

Patent Literatures

Patent Literature 1: Japanese Unexamined Patent Publication No. 2001-140907
Patent Literature 2: Japanese Unexamined Patent Publication No. 2003-4055
Patent Literature 3: Japanese Unexamined Patent Publication No. 2003-227521

SUMMARY OF INVENTION

Technical Problem

However, the inventor of the present invention has found that there are points to be further improved in the above-described conventional sealing structure of the bearing. That is, since the manufacturing of the bearing involves tolerances, the shape of bearing components varies slightly within the range of tolerance. Furthermore, when the bearings manufactured in a large number are compared with one another, the mounting positions and mounting orientations of the sealing plates and the like are not made totally identical but are slightly shifted. For this reason, the bearings manufactured in a large number include variations within or exceeding the range of tolerance in the fastening allowance described above.

While Patent Literature 2 describes that the volume and the radial position of the two lips are set so that the centrifugal force generated at the dust lip and the contact lip is substantially equal when the outer diameter edge of the seal ring is fixed to the groove of the outer ring, the centrifugal force may become unbalanced.

In addition, while Patent Literature 3 describes that the waist portion is set in an orientation substantially perpendicular to the center axis of the bearing in a state where the sealing device is mounted to the bearing, this may not actually happen and the waist portion may tilt.

In addition, if the waist portion tilts axially outward, the contact between the lip and the inner ring becomes insufficient, and the sealing performance may be impaired. Furthermore, if the above-described fastening allowance is large, the lip reaction force of the main lip of the sealing plate becomes large, and the generation of heat due to friction increases, so that there is a possibility that the temperature of the bearing rises.

In particular, in the automobile field, space saving of the engine room has been advanced recently, and there is a demand for reducing the size of the auxiliary machine attached to the engine while keeping the size of the engine main body unchanged, or a demand for reducing the diameter of a pulley that supports the engine belt. If the pulley diameter is reduced while keeping the speed of the engine belt unchanged, the rotation speed of the pulley bearing that rotatably supports the pulley increases. Specifically, it reaches 10000 [rpm] or more, and sometimes 20000 [rpm]. Since the bearing rotates at high speed in this manner, measures to suppress temperature rise are required for the bearing.

Therefore, the inventor of the present invention has focused on improving the performance of the sealing plate in order to suppress the temperature rise of the pulley bearing accompanying the high rotation.

In view of the above circumstances, an object of the present invention is to provide a preferred bearing seal capable of suppressing the temperature rise of a bearing while ensuring the sealing performance regardless of variations in mounting position.

Solution to Problem

For this purpose, a bearing seal structure according to the present invention includes a bearing seal that includes a seal main body portion that is attached to a rotating outer ring of a bearing and covers an annular gap between the rotating outer ring and a fixed inner ring of the bearing, a waist portion that protrudes from an inner diameter edge of the seal main body portion to an inner diameter side and that is elastically deformable so as to tilt toward an axial direction, a first lip that protrudes from an inner diameter edge of the waist portion to an axial inside and that comes into contact with the fixed inner ring with a fastening allowance C, and a second lip that protrudes from the inner diameter edge of the waist portion to an axial outside, in which the bearing seal in which the first lip and the second lip are rotationally displaced about a rotation center that is positioned on an outer diameter side with respect to the first lip and the second lip according to the fastening allowance C is assumed. Then, in a free state without the fastening allowance C, a center of gravity of a portion that includes the waist portion, the first lip, and the second lip is present in an axial direction inside with respect to the rotation center, and an axial distance A from the rotation center to the center of gravity is included in a range of more than 0 and less than the fastening allowance C.

According to the present invention, the position of the center of gravity is changed according to the fastening allowance C. For this reason, even when the fastening allowance is relatively small due to the variation in the mounting position of the bearing seal and the reaction force of the first lip against the inner ring is too small at the time of stopping rotation of the bearing, the centrifugal force acts on the center of gravity of the portion that includes the waist portion, the first lip, and the second lip at the time of high rotation of the bearing, and the first lip tends to move to the axial inside. As a result, the sealing performance of the bearing seal can be ensured by making the reaction force of the first lip sufficient at the time of high rotation.

Even when the fastening allowance is relatively large due to the variation in the mounting position of the bearing seal and the reaction force of the first lip against the inner ring is too large at the time of stopping rotation of the bearing, the centrifugal force acts on the center of gravity of the portion that includes the waist portion, the first lip, and the second lip at the time of high rotation of the bearing, and the first lip tends to move to the axial outside. As a result, the sealing performance of the bearing seal can be ensured by making the reaction force of the first lip appropriate so as not to be excessive at the time of high rotation. In addition, it is possible to suppress the generation of frictional heat between the main lip and the inner ring, which has been a concern with conventional bearing seals, thereby improving the durability of the bearing seal.

According to the present invention, as described above, the lip reaction force increases by increasing the rotation speed if the reaction force of the first lip at the time of stopping rotation is too small, and the lip reaction force decreases by increasing the rotation speed if the reaction force of the first lip at the time of stopping rotation is too large. Accordingly, even if there is a variation in the lip reaction force at the time of stopping rotation due to the variation in the fastening allowance of the bearing seal, the lip reaction force converges as the rotation speed increases. Furthermore, according to the present invention, it is also possible to suppress the variation in temperature rise of the bearing due to the variation in the fastening allowance. Accordingly, it is possible to exert a stable sealing performance at the time of high-speed rotation of the bearing. The present invention is extremely advantageous to an idler pulley that is provided in an engine and operated at high-speed rotation for a long period of time.

According to the present invention, since the lip reaction force is adjusted by the action of the centrifugal force based on the center of gravity of the total weight of the three portions including the waist portion, the first lip, and the second lip, it is possible to eliminate the variation in fastening allowance at the time of high rotation, unlike the conventional bearing seal in which the centrifugal force is balanced only by the two lips.

With respect to a flat cross section including the axis of the bearing, the sectional shape and orientation of the waist portion are not particularly limited. In one embodiment of the present invention, the waist portion tilts so as to be positioned in the axial inside as the waist portion goes toward the inner diameter side in a free state of the original shape without fastening allowance. According to this embodiment, even if the waist portion elastically deforms to the axial outside in a state where the bearing seal is attached to the bearing with the axial fastening allowance, the center of gravity is positioned to the axial inside as viewed from the rotation center as long as the fastening allowance is small. Accordingly, the sealing performance of the bearing seal can be ensured by sufficiently increasing the reaction force of the first lip at the time of high rotation when the fastening allowance is too small.

In one embodiment of the present invention, in the fastening allowance that serves as a boundary value between a fastening allowance small region and a fastening allowance large region, the axial position of the center of gravity coincides with the rotation center, and the waist portion slightly tilts so as to be positioned to the axial outside as the waist portion goes toward the inner diameter side. According to this embodiment, since the waist portion slightly tilts when the fastening allowance is appropriate, the lip reaction force gradually decreases as the rotation speed of the bearing increases. Accordingly, it is possible to reduce the frictional heat generated at a sliding contact portion of the first lip and the inner ring at the time of high rotation.

The bearing seal has a shape constricted at the waist portion, and the first and second lips of the inner diameter edge of the bearing seal are easily moved in the axial direction. The thickness of the waist portion is not particularly limited, but is preferably thinner than that of the seal main body portion, and is preferably thinner than the dimension from the axial inner end of the first lip to the axial outer end of the second lip. In one embodiment of the present invention, with respect to the axis of the bearing, the axial thickness of the waist portion is smallest on the outer diameter side. According to this embodiment, the rotation center of the waist portion, the first lip, and the second lip is easily set to the outer diameter edge of the waist portion.

The shape of the first lip is not particularly limited. For example, the tip of the first lip has an angular shape. Alternatively, the tip of the first lip has a round shape. As a preferred embodiment of the present invention, the sectional shape of the first lip at the axial inner end portion is rounded with a radius of 0.05 [mm] or more. According to this embodiment, it is possible to suppress variation in the reaction force with which the first lip presses the inner ring.

As a preferred embodiment, the pulley bearing of the present invention includes a fixed inner ring, a rotating outer ring, a pulley main body fixed to the rotating outer ring, and the bearing seal structure described above. According to this embodiment, the sealing performance of the high rotation type pulley can be stabilized using the centrifugal force.

A design method of a bearing seal of the present invention is that, in a bearing seal that includes a seal main body portion that is attached to an axial end portion of a rotating outer ring of a bearing and covers an annular gap between a fixed inner ring and the rotating outer ring of the bearing, a waist portion that protrudes from an inner diameter edge of the seal main body portion to an inner diameter side and elastically deforms so as to tilt toward an axial outside as a fastening allowance for fastening to an axial inside is larger, a first lip that protrudes from an inner diameter edge of the waist portion to the axial inside and presses an axial end portion of the fixed inner ring to the axial inside with a larger reaction force as the fastening allowance is larger, and a second lip that protrudes from the inner diameter edge of the waist portion to the axial outside, a center of gravity of a portion that includes the waist portion, the first lip, and the second lip, and a rotation center of a portion that includes the waist portion, the first lip, and the second lip are set so that a reaction force of the first lip against the fixed inner ring increases due to a centrifugal force generated by rotation of the bearing when the fastening allowance is relatively small, and a reaction force of the first lip against the fixed inner ring decreases due to a centrifugal force generated by rotation of the bearing when the fastening allowance is relatively large. According to the present invention, similarly to the bearing seal structure described above, the position of the center of gravity is designed to change in accordance with the fastening allowance. Accordingly, even if the fastening allowance is insufficient or the fastening allowance is excessive, it is possible to cause the lip reaction force to converge into an appropriate range as the rotation speed of the bearing increases.

Advantageous Effects of Invention

As described above, according to the present invention, it is possible to provide a preferred bearing seal capable of suppressing temperature rise of a bearing while ensuring sealing performance regardless of variation in the mounting position.

DESCRIPTION OF EMBODIMENTS

Figure 1:
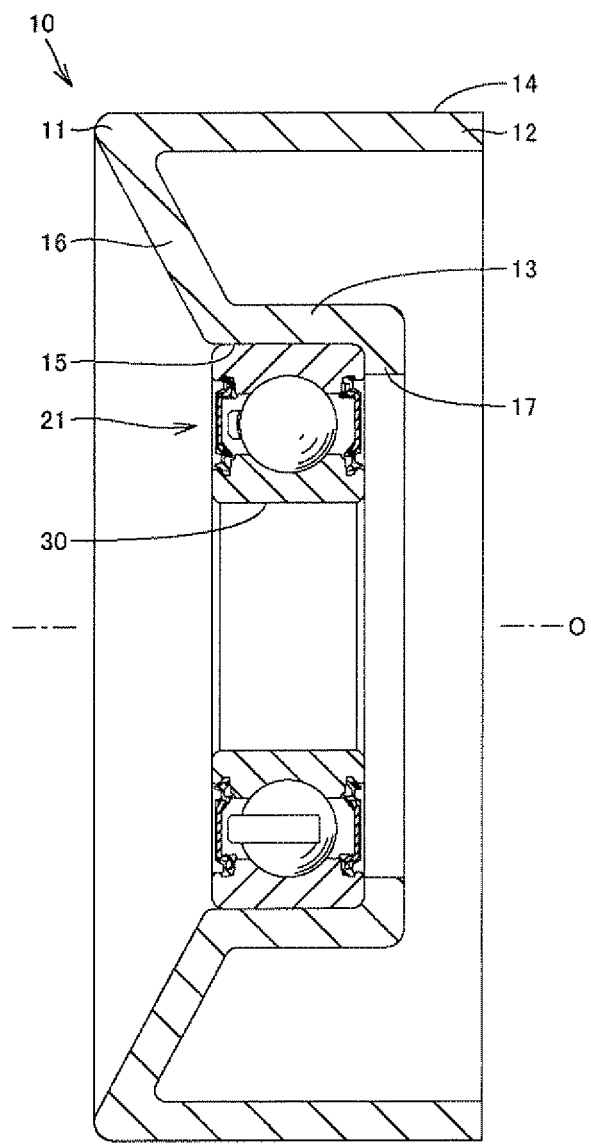
FIG. 1 is a sectional view showing a pulley that includes a bearing seal structure according to an embodiment of the present invention.
Figure 2:
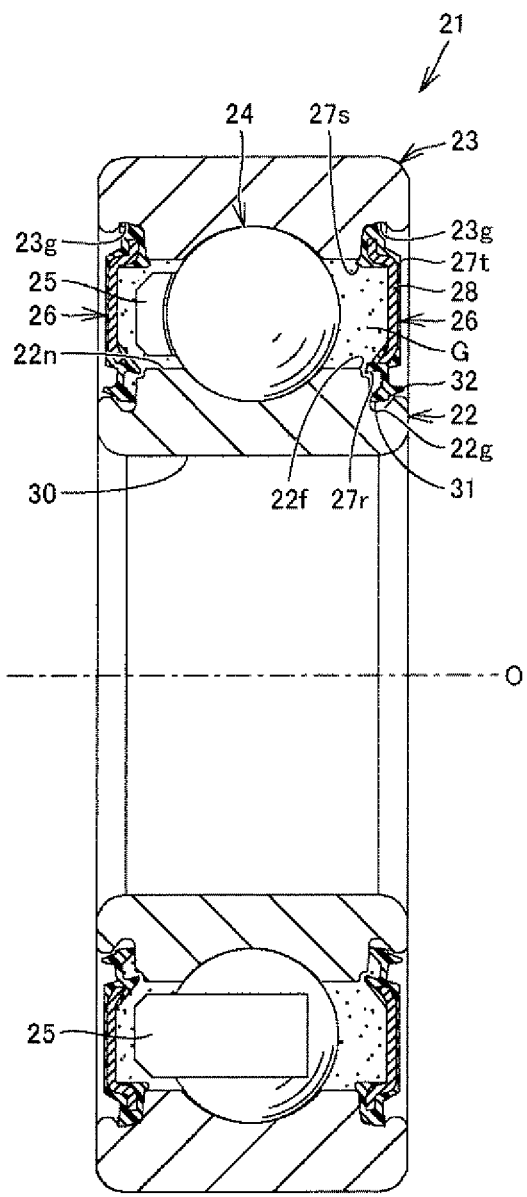
FIG. 2 is a longitudinal sectional view of a pulley bearing of FIG. 1.

Hereinafter, an embodiment of the present invention will be described in detail with reference to the drawings. FIG. 1 shows a pulley that includes a bearing seal structure according to the embodiment of the present invention, illustrating a cross section of a pulley cut in a flat cross section including an axis O serving as a rotation center of a bearing. FIG. 2 is a longitudinal sectional view showing a pulley bearing shown in FIG. 1 taken out. As shown in FIG. 1, a pulley 10 includes a circular pulley main body 11 and a pulley bearing 21. The pulley main body 11 is made of a steel plate press. The pulley main body 11 includes an external cylinder portion 12, an internal cylinder portion 13 having a smaller diameter than that of the external cylinder portion 12, an intermediate wall 16 integrally coupling axial ends of the external cylinder portion 12 and the internal cylinder portion 13 together, and an inward flange portion 17 that protrudes from the other axial end of the internal cylinder portion 13 to the inner diameter side. Needless to say, the external cylinder portion 12 and the internal cylinder portion 13 have the axis O in common. The external cylinder portion 12, the internal cylinder portion 13, and the intermediate wall 16 have a substantially equal thickness. The pulley main body 11 may be made of resin.

The axis O direction dimension of the external cylinder portion 12 is larger than the axis O direction dimension of the internal cylinder portion 13. The axis O direction center of the external cylinder portion 12 coincides with the axis O direction center of the internal cylinder portion 13. Due to this, the intermediate wall 16 tilts toward the axis O direction outside as it goes toward the outer diameter side.

An unshown belt such as an engine belt is wound around an outer circumferential surface 14 of the external cylinder portion 12. The pulley bearing 21 is fitted to an inner circumferential surface 15 of the internal cylinder portion 13. The bearing 21 of the present embodiment is a bearing for an automotive auxiliary machine. An unshown fixed shaft is inserted into a center hole 30 of the pulley bearing 21 to be fitted with each other. Due to this, the pulley bearing 21 rotatably supports the pulley main body 11 on the fixed shaft. The pulley 10 is an idler pulley provided on the surface of the automobile engine and rotates in response to the traveling speed of the belt. The belt is driven by the engine. The rotation speed of the pulley bearing 21 is, for example, 0 to 20000 [rpm].

An idler pulley for an automobile is used as a belt tensioner of a drive belt that transmits the rotation of the engine to an auxiliary machine of the automobile. The idler pulley for an automobile has both a function as a pulley for giving tension as a tensioner to a belt when the distance between shafts is fixed, and a function as an idler for reducing the engine interior volume by using the idler pulley for guiding the belt or avoiding obstacles. For this reason, the pulley bearing 21 as a rolling bearing for an idler pulley is required to have heat resistance, grease sealing performance, and durability that can withstand extremely severe environments such as high-speed rotation at a rotation speed of 10000 [rpm] or more at a high temperature of 180° C. or more. Grease is used for lubricating the pulley bearing 21.

As shown in FIG. 2, the pulley bearing 21 is a radial bearing that includes an inner ring 22, an outer ring 23, a plurality of rolling elements 24, a retainer 25, and a bearing seal structure (hereinafter simply referred to as bearing seal) 26, and is a single-row, deep-groove ball bearing. The inner ring 22 does not rotate because it is fitted with an unshown fixed shaft that is passed through the center hole of the inner ring 22. The outer ring 23 rotates together with the pulley main body 11 described above. That is, the pulley bearing 21 is a bearing for outer ring rotation. In the following description, the outer ring 23 may be referred to as a rotating outer ring and the inner ring 22 may be referred to as a fixed inner ring. In the following description, a direction along a center axis (axis O) of the pulley bearing 21 is referred to as "axial (or axis direction)", and a direction orthogonal to the axis O is referred to as "radial".

The inner ring 22, the outer ring 23, and the rolling elements 24 are formed of a metal material. Specific examples of metal materials include bearing ring materials such as bearing steel (high carbon chromium bearing steel JISG4805), case hardening steel (JISG4104 and the like), high-speed steel (AMS6490), stainless steel (JISG4303), and induction hardening steel (JISG4051 and the like). Examples of the material of the retainer 25 include cold-rolled steel sheets (JISG3141 and the like) for a punching retainer, carbon steel (JISG4051) for a machining retainer, and high-strength brass casting (JISH5102 and the like) for a machining retainer. The retainer 25 is formed of a resin material. The retainer 25 may be formed of a metal material.

The bearing seal 26 has a circular ring shape and is attached to the outer ring 23 at each axis O direction end portion, thereby sealing an annular gap G between the inner ring 22 and the outer ring 23. The annular gap G is filled with grease. The bearing seal 26 may be attached to the outer ring 23 on one side of the axis O direction. In relation to the bearing seal 26, a first circumferential groove 22g and a second circumferential groove 22f are formed in the inner ring 22 at both end portions of the axis O direction. The first circumferential groove 22g is disposed in the axis O direction outside and on the inner diameter side with respect to the second circumferential groove 22f.

Figure 3:
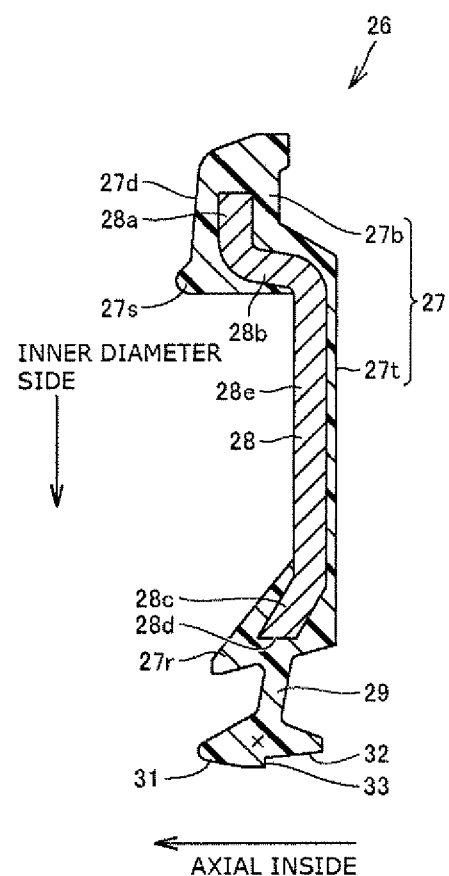
FIG. 3 is a sectional view of a bearing seal of FIG. 2 in a free state.

FIG. 3 is an enlarged sectional view showing the bearing seal 26 in FIG. 2 taken out. FIG. 3 shows the bearing seal 26 before mounted on the pulley bearing 21, which is a free state of the original shape that is not elastically deformed at all. As shown in FIGS. 2 and 3, the bearing seal 26 has a seal main body portion 27, a core member 28, a waist portion 29, a main lip (first lip) 31, and a dust lip (second lip) 32. The material of the bearing seal 26 is rubber, specifically nitrile rubber. The material of the bearing seal 26 may be hydrogenated nitrile rubber, acrylic rubber, fluorine rubber, or the like. The core member 28 and the rubber are integrally molded by vulcanizing and molding rubber on the surface of the core member 28.

The seal main body portion 27 includes the single core member 28 therein. The core member 28 is made of a material that does not easily deform, such as a metal plate, a plastic plate, or a ceramic plate. The surface of the core member 28, specifically at least the axis O direction outside surface, is covered with rubber. The core member 28 is a ring-shaped disk that has a constant thickness in the axis O direction and includes an outer diameter edge 28a, a step 28b, a standing plate portion 28e, and an inner diameter edge 28c. A portion of the core member 28 excluding the inner surface of the standing plate portion 28e is covered with rubber.

) The standing plate portion 28e of the core member 28 is a plate substantially perpendicular to the axis O, and the step 28b is provided on the outer diameter side thereof, and the inner diameter edge 28c is provided on the inner diameter side thereof. The inner diameter edge 28c of the core member 28 has a sectional shape tilting so as to tilt toward the axis O direction inside by changing the direction at a predetermined angle included in a range of 20° to 70° with respect to the standing plate portion 28e. The inner diameter edge 28c has a cylindrical inner circumferential surface 28d. The inner diameter edge 28c is covered with the seal main body portion 27 on an axis O direction outside surface, an axis O direction inside surface, and the inner circumferential surface 28d.

The step 28b of the core member 28 extends from the outer diameter end portion of the standing plate portion 28e to the axis O direction inside. The outer diameter edge 28a of the core member 28 has a flange shape that expands from the axis O direction inner end of the step 28b to the outer diameter direction.

The seal main body portion 27 of the bearing seal 26 has a ring shape and includes a base portion 27b and a plate portion 27t. The base portion 27b is a portion that is fitted in a seal fitting groove 23g formed at both axis O direction end portions of the outer ring 23 and extending circumferentially, and covers the outer diameter end portion (the outer diameter edge 28a and the step 28b) of the core member 28. The plate portion 27t is a portion that is positioned between the base portion 27b and the waist portion 29 described later. The plate portion 27t is a portion that is positioned on the inner diameter side with respect to the base portion 27b and covers the inner diameter side region (the standing plate portion 28e and the inner diameter edge 28c) of the core member 28. The plate portion 27t has a thickness in the axis O direction. The base portion 27b is thicker than the plate portion 27t and protrudes to the axis O direction inside as viewed from the plate portion 27t.

The outer diameter edge 28a and the step 28b of the core member 28 are embedded in the base portion 27b. As a result, the core member 28 is supported by the base portion 27b and does not move easily. The outer diameter edge 28a of the core member 28 is positioned radially outside at least half the groove depth from the groove edge to the groove bottom of the seal fitting groove 23g. This reduces the amount of rubber in the base portion 27b fitted in the seal fitting groove 23g.

The plate portion 27t that makes up most of the bearing seal 26 faces the annular gap G and covers the annular gap G. When the pulley bearing 21 rotates, the grease in the annular gap G receives centrifugal force and presses the plate portion 27t to the axis O direction outside. Even in this case, elastic deformation of the base portion 27b is reduced, and the amount of displacement of the core member 28 toward the axis O direction outside due to the elastic deformation is kept within a range in which grease leakage can be prevented.

A projection 27s that protrudes to the axis O direction inside is formed on the inner diameter side of a side surface 27d of the base portion 27b on the axis O direction inside.

The projection 27s is also referred to as a grease leakage prevention lip and extends over the entire circumference of the bearing seal 26. As shown in FIG. 2, when the base portion 27b is fitted in the seal fitting groove 23g, the projection 27s abuts against the inner circumferential surface of the outer ring 23 to improve the adhesion between the outer ring 23 and the base portion 27b.

The plate portion 27t has a substantially constant thickness in the axis O direction in most of the seal main body portion 27 except the inner diameter edge, but is formed thicker toward the inner diameter side at the inner diameter edge. Specifically, the plate portion 27t includes a grease lip (third lip) 27r that protrudes from the inner diameter edge thereof to the axis O direction inside like an eave.

The grease lip 27r has a sectional shape that tapers toward the axis O direction inside. As shown in FIG. 2, the grease lip 27r protrudes toward the inner diameter side with respect to an inner circumferential surface 22n of the inner ring 22 and axially faces the inner ring 22 with a slight gap. The grease lip 27r retains grease in the annular gap G.

Figure 5:
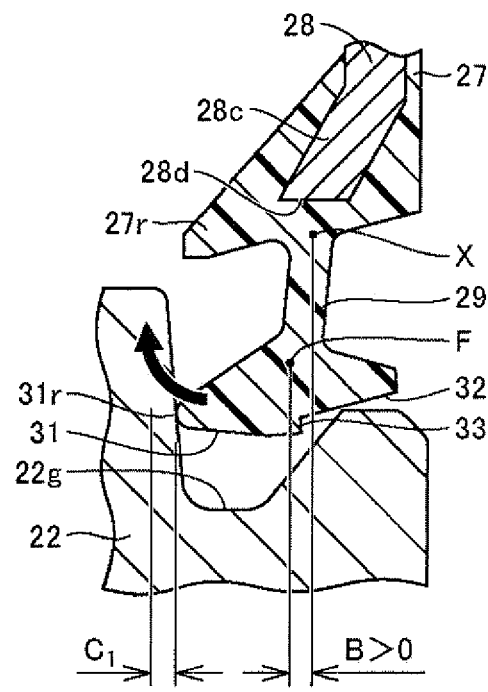
FIG. 5 is an enlarged sectional view showing an inner diameter edge of a bearing seal in a state where fastening allowance is relatively small.
Figure 6:
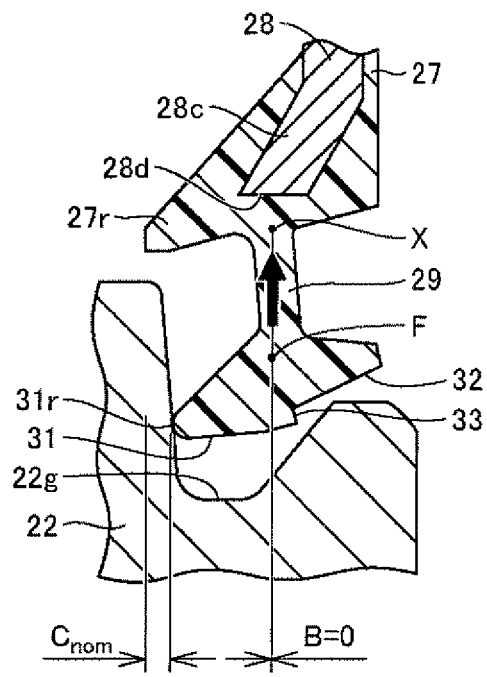
FIG. 6 is an enlarged sectional view showing an inner diameter edge of a bearing seal in a boundary state where the fastening allowance is neither small nor large.
Figure 7:
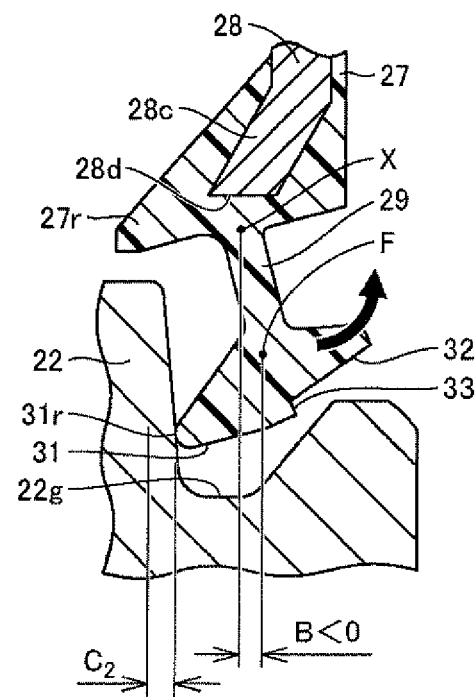
FIG. 7 is an enlarged sectional view showing an inner diameter edge of a bearing seal in a state where the fastening allowance is relatively large.
Figure 8:
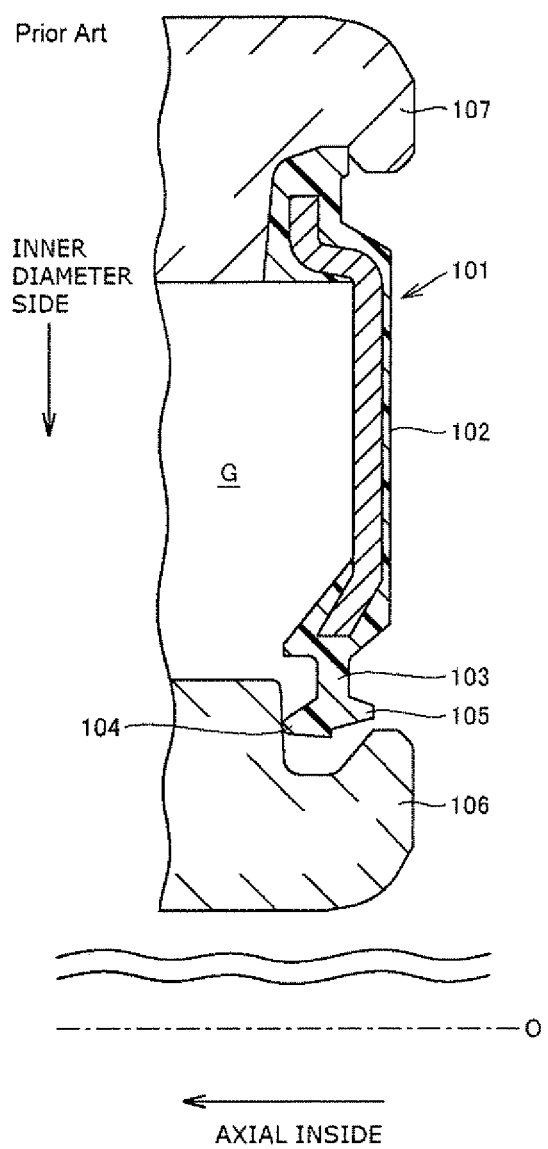
FIG. 8 is a sectional view of a bearing that includes a conventional seal ring.

The tip of the grease lip 27r is directed to the second circumferential groove 22f formed at the axis O direction end portion of the inner ring 22 when the fastening allowance of the bearing seal 26 is neither small nor large, as will be described later in detail, so that the gap between the tip of the grease lip 27r and the inner ring 22 is reduced. This makes it difficult for the grease in the annular gap G to pass through the slight gap formed between the grease lip 27r and the second circumferential groove 22f. The grease lip 27r does not include the core member 28 and can elastically deform. As shown in FIGS. 5 to 7 described later, the second circumferential groove 22f can be omitted.

The waist portion 29 is erected at the axis O direction center portion of the inner diameter edge of the seal main body portion 27. The root (outer diameter edge) of the waist portion 29 faces the inner circumferential surface 28d of the core member 28 and integrally couples with the inner diameter edge of the seal main body portion 27. The two lips 31 and 32 are provided at the tip of the waist portion 29 that protrudes from the inner diameter edge of the seal main body portion 27 to the inner diameter side. The waist portion 29 and the lips 31 and 32 do not include the core member 28.

The main lip 31, which is the first lip of the two lips, protrudes from the inner diameter edge of the waist portion 29 to the axis O direction inside. The main lip 31 is spaced apart from the grease lip 27r toward the inner diameter side. Due to this, the grease lip 27r, the waist portion 29, and the main lip 31 partition a recess portion open to the axis O direction inside.

The dust lip 32, which is the second lip of the two lips, protrudes from the inner diameter edge of the waist portion 29 to the axis O direction outside. The dust lip 32 is spaced apart from an axial outside portion of the inner diameter edge of the seal main body portion 27. Due to this, the axial outside portion, the waist portion 29, and the dust lip 32 partition a recess portion open to the axis O direction outside. That is, the axis O direction thickness of the bearing seal 26 is made thin at the waist portion 29 and made thick at the remaining portion.

The bearing seal 26 is mounted so as to be pushed toward the axis O direction inside, and elastically deforms from a free state. This pushing distance C is referred to as a fastening allowance. As shown in FIG. 2, in a state where the bearing seal 26 is mounted to the pulley bearing 21, the main lip 31 comes into contact with the inner ring 22 with the fastening allowance, and gives the inner ring 22 a lip reaction force corresponding to the fastening allowance. The main lip 31 is brought into close contact with the inner ring 22 by the lip reaction force (hereinafter also referred to as strained force) and seals the annular gap G. The lip reaction force refers to a force by which the main lip 31 pushes back the inner ring 22 when the main lip 31 moves by being pushed to the axis O direction outside by the inner ring 22 by the same distance as the fastening allowance C. The fastening allowance C is included in a range from a minimum fastening allowance $C_{min}$ or more to a maximum fastening allowance $C_{max}$ or less.

In addition, an axis O direction inner end portion 31r, which is the tip of the main lip 31, is rounded with a radius of 0.05 [mm] or more in a flat sectional shape including the axis O. Due to this, it is possible to suppress variation in the reaction force by which the main lip 31 presses the inner ring 22. When the round shape is less than the radius of 0.05 [mm], the variation in the lip reaction force increases, and the axis O direction inner end portion 31r has an undesired elastic deformation.

The round shape of the axis O direction inner end portion 31r is preferably 2.0 [mm] or less. If the round shape exceeds the radius of 2.0 [mm], the tip of the main lip 31 becomes large, which may interfere with the first circumferential groove 22g. When the shape of the first circumferential groove 22g is deformed in order to prevent interference between the main lip 31 and the first circumferential groove 22g, the degree of freedom in design of the first circumferential groove 22g decreases. For the same reason, the sectional shape at the axial inner end portion of the first lip is more preferably rounded with a radius of 0.05 [mm] or more to 1.0 [mm] or less.

The dust lip 32 faces the inner ring 22 across a slight gap, as will be described in detail later. This causes the dust lip 32 to prevent foreign matters from entering in the axis O direction inside beyond the dust lip 32 from the outside of the pulley bearing 21.

Figure 4:
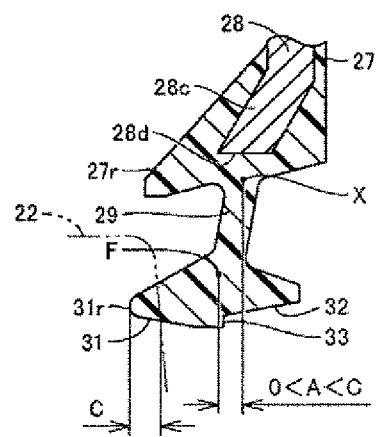
FIG. 4 is an enlarged sectional view showing an inner diameter edge of the bearing seal of FIG. 3.

FIG. 4 is an enlarged sectional view showing the inner diameter edge of the bearing seal 26 shown in FIG. 3 taken out. The two lips 31 and 32 are connected to the seal main body portion 27 at the elastically deformable waist portion 29, and capable of swinging around a rotation center X positioned at the root of the waist portion 29. The rotation center X is positioned on the outer diameter side with respect to the lips 31 and 32.

The two lips 31 and 32 are made of rubber and integrally couple with the waist portion 29. A center of gravity F, which indicates the position of the total weight of the three portions of the lips 31 and 32 and the waist portion 29, is defined as a point, in the cross section shown in FIG. 4, where the area of the axial outside of these three portions is equal to the area of axial inside thereof, and where the area on the outer diameter side and the area on the inner diameter side of these three portions are equal to each other. That is, in the bearing seal 26, the center of gravity F is the center of gravity of a portion that includes the lips 31 and 32 and the waist portion 29. The above definition is based on an assumption that the lips 31 and 32 and the waist portion 29 are made only of rubber having a uniform weight. If the weight of the rubber is not uniform in these three portions, or if these three portions include partially materials with different unit weights, the center of gravity is corrected so as to be close to the heavier one.

The center of gravity F can be obtained by inputting a flat cross section including the axis O with respect to the bearing seal 26 into computer aided design (CAD, for example, "MICRO CADAM Helix" manufactured by CAD SOLUTIONS Inc.), and designating the waist portion 29, the main lip 31, and the dust lip 32. The center of gravity F is positioned on the inner diameter side with respect to the waist portion 29. That is, the center of gravity F is positioned inside the portion of the bearing seal 26 that includes the main lip 31 and the dust lip 32.

As shown in FIG. 4, in a free state of the bearing seal 26, the waist portion 29 tilts toward the axis O direction inside, and the inner diameter edge of the waist portion 29 is positioned in the axis O direction inside with respect to the root. The center of gravity F (common to the lips 31 and 32 and the waist portion 29) of the portion of the bearing seal 26 that includes the lips 31 and 32 and the waist portion 29 is also positioned in the axis O direction inside with respect to the rotation center X. Let A be an axis O direction distance from the rotation center X to the center of gravity F. Here, the axis O direction distance A is the shortest distance between the rotation center X and the center of gravity F, and more specifically, it is the shortest distance when the center of gravity F is connected to an imaginary extension line (dashed line shown in FIG. 4) extending from the rotation center X toward the lips 31 and 32 side. The axis O direction distance A is larger than 0. Furthermore, the axis O direction distance A is smaller than the fastening allowance C in the axis O direction (0<A<C). In order to ensure the adjustment of the lip reaction force described later, the axis O direction distance A is preferably smaller than the maximum fastening allowance $C_{max}$ (0<A<$C_{max}$).

FIGS. 5 to 7 are enlarged sectional views showing the inner diameter edge of the bearing seal 26 mounted to the pulley bearing 21 taken out. The bearing seal 26 is mounted to the pulley bearing 21 with a fastening allowance for fastening to the axis O direction inside. In this case, the dust lip 32 is not housed in the first circumferential groove 22g of the inner ring 22 and protrudes to the axis O direction outside with respect to the first circumferential groove 22g. Then, the inner diameter side portion of the dust lip 32 faces the axis O direction end portion of the inner ring 22 across a slight gap. It is difficult for foreign matters outside the pulley bearing 21 to pass through the gap. Due to this, the dust lip 32 prevents foreign matters from entering the axis O direction inside beyond the dust lip 32.

When the bearing seal 26 is mounted to the pulley bearing 21 with a fastening allowance for fastening to the axis O direction inside, the inner diameter side portion of the main lip 31 is housed in the first circumferential groove 22g provided at the axis O direction end portion of the inner ring 22. Then, the tip of the main lip 31 comes into contact with the side surface of the first circumferential groove 22g in the axis O direction inside, and moves to the axis O direction outside by the same distance as the fastening allowance C. In other words, the fastening allowance C is a movement amount C of the main lip 31 toward the axis O direction outside at the time of stopping rotation. The side surface of the first circumferential groove 22g in the axis O direction outside that does not come into contact with the main lip 31 tilts with a gradient. This gradient is approximately 45°.

The pulley bearings 21 manufactured in a large number in factories have different fastening allowances for each bearing in a precise sense, although the fastening allowances of the bearing seals 26 look the same. The reason for this is, as a static reason, due to manufacturing tolerances of the inner ring 22, the outer ring 23, and the rolling element 24, temperature characteristics such as thermal expansion coefficient of the inner ring 22, the outer ring 23, and the rolling element 24, fit tolerances of the inner ring 22 and the outer ring 23, and the like. Furthermore, as a dynamic reason, it is due to the rotation speed of the pulley bearing 21 and the operating temperature of the pulley bearing 21.

For this reason, in the following description, the fastening allowance C is classified into a relatively small fastening allowance $C_1$ shown in FIG. 5, a relatively large fastening allowance $C_2$ shown in FIG. 7, and a fastening allowance $C_{nom}$ that is a boundary value between a fastening allowance small region ($C_{min} \leq C_1 < C_{nom}$) and a fastening allowance large region ($C_{nom} < C_2 \leq C_{max}$) shown in FIG. 6. The variation width in the fastening allowance that is the difference between the maximum fastening allowance $C_{max}$ and the minimum fastening allowance $C_{min}$ is based on the tolerance of the pulley bearing 21.

An axis O direction distance B from the rotation center X to the center of gravity F shown in FIGS. 5 to 7 is expressed by the difference between the axis O direction distance A (FIG. 4) in the free state and the fastening allowance of the bearing seal 26 (B<A). The axis O direction distance B is the shortest distance between the rotation center X and the center of gravity F in a state where the bearing seal 26 is mounted to the pulley bearing 21.

In the fastening allowance $C_1$ in the relatively small fastening allowance small region shown in FIG. 5, a relation of the axis O direction distance B=A−$C_1$>0 is satisfied. In the fastening allowance $C_1$ belonging to the fastening allowance small region, the axis O direction distance B of the center of gravity F is B>0, and the center of gravity F is positioned in the axis O direction inside with respect to the rotation center X. In the case of FIG. 5, the elastic deformation of the waist portion 29 is relatively small, and the waist portion 29 tilts toward the axis O direction inside.

In the fastening allowance $C_2$ in the relatively large fastening allowance large region shown in FIG. 7, a relation of B=A−$C_2$<0 is satisfied. In the fastening allowance $C_2$ belonging to the fastening allowance large region, the axis O direction distance B of the center of gravity F is B<0, and the center of gravity F is positioned in the axis O direction outside with respect to the rotation center X. This is because the axis O direction distance A is set to be larger than 0 and smaller than the maximum fastening allowance $C_{max}$, as described above. In the case of FIG. 7, the elastic deformation of the waist portion 29 is relatively large, and the waist portion 29 tilts toward the axis O direction outside.

When the fastening allowance $C_1$ shown in FIG. 5 is the minimum value $C_{min}$ and the fastening allowance $C_2$ shown in FIG. 7 is the maximum value $C_{max}$, the rotation center X falls within a width from the axis O direction position of the center of gravity F shown in FIG. 5 to the axis O direction position of the center of gravity F shown in FIG. 7.

In the fastening allowance $C_{nom}$ of the boundary value shown in FIG. 6, a relation of B=A−$C_{nom}$=0 is satisfied. In the fastening allowance $C_{nom}$ of the boundary value, the axis O direction distance B of the center of gravity F is B=0, and the axis O direction position of the center of gravity F and the axis O direction position of the rotation center X coincide with each other. In the case of FIG. 6, the elastic deformation of the waist portion 29 is neither large nor small, and the waist portion 29 slightly tilts toward the axis O direction substantially outside.

As shown in FIGS. 4 to 7, it is preferable that the axis O direction position of the rotation center X substantially coincides with the axis O direction center of the inner circumferential surface 28d of the core member 28. It is preferable that the rotation center X substantially coincides with the axis O direction center of the root of the waist portion 29. The rotation center X is positioned at a boundary portion (outer diameter edge of the waist portion 29)

between the seal main body portion 27 and the waist portion 29. The rotation center X is positioned substantially at the center in the axis O direction thickness of the waist portion 29.

As shown in FIGS. 4 to 7, the axis O direction thickness of the waist portion 29 is substantially constant from the outer diameter side to the inner diameter side. As another modification that is unshown, the axis O direction thickness of the waist portion 29 may be smaller at the root (outer diameter edge) than another portion. For example, the axis O direction thickness of the waist portion 29 may be smallest at the root (outer diameter edge) and largest at the inner diameter edge. Specifically, for example, the axis O direction thickness of the waist portion 29 may gradually increase from the outer diameter side toward the inner diameter side. Due to this, the rotation center X can be set at the root (outer diameter edge) of the waist portion 29.

The lip reaction force at the time of stopping rotation in the three states ($C_1$, $C_{nom}$, $C_2$) classified by the size of fastening allowance has been described so far. Next, the lip reaction force at the time of bearing rotation in the three states will be described.

When the pulley bearing 21 rotates in the relatively small fastening allowance $C_1$ shown in FIG. 5, centrifugal force directed in the outer diameter direction acts on the center of gravity F, the waist portion 29 tends to tilt around the rotation center X (clockwise in FIG. 5) as shown by the thick arrow, and, with this, the main lip 31 and the dust lip 32 tend to move to the axis O direction inside. As the rotation speed of the pulley bearing 21 increases, the main lip 31 tends to approach the inner ring 22 with a greater force. That is, as the rotation speed increases, the centrifugal force in the outer diameter direction increases, and the force (lip reaction force) by which the main lip 31 presses the inner ring 22 gradually increases.

When the pulley bearing 21 rotates in the relatively large fastening allowance $C_2$ shown in FIG. 7, centrifugal force directed in the outer diameter direction acts on the center of gravity F, the waist portion 29 tends to tilt around the rotation center X (anticlockwise in FIG. 7) as shown by the thick arrow, and, with this, the main lip 31 and the dust lip 32 tend to move to the axis O direction outside. As the rotation speed of the pulley bearing 21 increases, the main lip 31 tends to move away from the inner ring 22 with a greater force. That is, as the rotation speed increases, the centrifugal force in the outer diameter direction increases, and the force (lip reaction force) by which the main lip 31 presses the inner ring 22 gradually decreases.

When the pulley bearing 21 rotates in the fastening allowance $C_{nom}$ of the boundary value shown in FIG. 6, the centrifugal force directed in the outer diameter direction acts on the center of gravity F, and the centrifugal force in the direction perpendicular to the axis O is given to the rotation center X as shown by the thick arrow. In this case, the waist portion 29 does not greatly tilt as shown in FIGS. 5 and 7, but the waist portion 29 slightly tilts to the axis O direction outside as shown in FIG. 6. Due to this, as the rotation speed of the pulley bearing 21 increases, the main lip 31 tends to move away from the inner ring 22 with a smaller force as compared to the case of FIG. 7. That is, as the rotation speed increases, the centrifugal force in the outer diameter direction increases, and the force (lip reaction force) by which the main lip 31 presses the inner ring 22 gradually decreases.

According to the present embodiment, regardless of the size of the fastening allowance C of the bearing seal 26, the lip reaction force of the bearing seal 26 converges to an appropriate range at the time of high-speed rotation of the pulley bearing 21. Here, the range in which the lip reaction force of the bearing seal 26 converges at the time of high-speed rotation is a narrow range smaller than a difference between the lip reaction force at the fastening allowance $C_{max}$ and the lip reaction force at the fastening allowance $C_{min}$ at the time of stopping rotation. Even if the pulley bearing 21 rotates in the fastening allowance $C_{nom}$ of the boundary value shown in FIG. 6, the lip reaction force converges to a predetermined narrow range, as the rotation speed increases. That is, even if the rotation speed of the pulley bearing 21 increases, variation in the strained force in the bearing seal 26 can be suppressed regardless of the size of the fastening allowance of the bearing seal 26. By suppressing the variation of the strained force, temperature rise of the pulley bearing 21 can be suppressed.

In addition, a step 33 directed to the axis O direction outside is formed at the boundary between the main lip 31 and the dust lip 32. Due to this, the main lip 31 is disposed on the inner diameter side with respect to the dust lip 32, and can enter deeply the first circumferential groove 22g. The dust lip 32 substantially deviates from the first circumferential groove 22g, but faces, across a slight radial gap, the inner ring 22 in the axis O direction outside with respect to the first circumferential groove 22g. Such a slight radial gap makes it impossible for foreign matters outside of the pulley bearing 21 to enter inside of the pulley bearing 21.

The bearing seal 26 of the present embodiment includes the seal main body portion 27, the waist portion 29, the main lip 31 that protrudes to the axis O direction inside from the inner diameter edge of the waist portion 29, and the dust lip 32 that protrudes to the axis O direction outside from the inner diameter edge of the waist portion 29, and the main lip 31 and the dust lip 32 assume the bearing seal 26 that is rotationally displaced to the axis O direction outside about the rotation center X according to the fastening allowance C. In a state before the bearing seal 26 is mounted to the pulley bearing 21, that is, in a free state without the fastening allowance C (FIG. 4), the center of gravity F is present in the axially inside with respect to the rotation center X, and the axis O direction distance A from the rotation center X to the center of gravity F is included in a range of more than 0 and less than C.

According to the present embodiment, in the fastening allowance small region ($C_{min} \leq C_1 < C_{nom}$), in which the fastening allowance of the bearing seal 26 is relatively small, the center of gravity F is positioned in the axis O direction inside with respect to the rotation center X of the portion of the bearing seal 26 including the waist portion 29, the main lip 31, and the dust lip 32 (common to the waist portion 29, the main lip 31, and the dust lip 32), as shown in FIG. 5. In the fastening allowance large region ($C_{nom} < C_2 \leq C_{max}$), in which the fastening allowance is relatively large, the center of gravity F is positioned in the axial outside with respect to the rotation center X.

According to the present embodiment, even if the fastening allowance $C_1$ is relatively small due to variation in the mounting position of the bearing seal 26 and the reaction force of the main lip 31 against the inner ring 22 is too small at the time of stopping rotation of the pulley bearing 21, the centrifugal force acts on the center of gravity F as shown in FIG. 5 at the time of high-speed rotation of the pulley bearing 21, and the main lip 31 tends to move to the axis O direction inside. Due to this, the reaction force of the main lip 31 can be sufficiently increased at the time of high-speed rotation to ensure the sealing performance of the bearing seal 26.

On the other hand, even if the fastening allowance is relatively large due to variation in the mounting position of the bearing seal 26 and the reaction force of the first lip 31 against the inner ring 22 is too large at the time of stopping rotation of the pulley bearing 21, the centrifugal force acts on the center of gravity F at the time of high-speed rotation of the bearing 21, and the first lip 31 tends to move to the axial outside. Due to this, the reaction force of the first lip 31 is appropriately prevented from becoming excessive at the time of high rotation to ensure the sealing performance of the bearing seal 26.

In the conventional bearing seal, there has been a concern about frictional heat at the time of high-speed rotation because the lip reaction force is too large. However, according to the present embodiment, the lip reaction force decreases at the time of high-speed rotation, allowing frictional heat to be suppressed, thereby improving the durability of the bearing seal 26. Furthermore, since the lip reaction force is adjusted by the action of the centrifugal force based on the center of gravity of the portion that includes the waist portion 29, the first lip 31, and the second lip 32, it is possible to eliminate the variation in fastening allowance at the time of high rotation, unlike the conventional bearing seal in which the centrifugal force is balanced only by the two lips.

According to the present embodiment, as described above, the lip reaction force increases by increasing the rotation speed if the lip reaction force of the main lip 31 at the time of stopping rotation is too small, and the lip reaction force decreases by increasing the rotation speed if the lip reaction force of the main lip 31 at the time of stopping rotation is too large. Accordingly, even if there is a variation in the lip reaction force at the time of stopping rotation due to the variation in the fastening allowance of the bearing seal 26, the lip reaction force converges to a narrow range as the rotation speed increases. Furthermore, according to the present embodiment, it is also possible to suppress the variation in temperature rise of the bearing due to the variation in the fastening allowance. Accordingly, it is possible to suppress temperature rise of the bearing 21 while exerting a stable sealing performance at the time of high-speed rotation of the pulley bearing 21. The present invention is extremely advantageous to an idler pulley that is provided in an engine and operated at high-speed rotation for a long period of time, such as the pulley 10. In order to ensure the above-described effect, it is preferable that the axis O direction distance A from the rotation center X to the center of gravity F is included in a range of more than 0 and less than C/2.

The waist portion 29 of the present embodiment tilts so as to be positioned to the axis O direction inside as it goes toward the inner diameter side in a free state without fastening allowance as shown in FIG. 4.

Hence, even if the waist portion 29 elastically deforms to the axis O direction outside in a state where the bearing seal 26 is attached to the bearing with fastening allowance in the axis O direction, the center of gravity F is positioned to the axis O direction inside as viewed from the rotation center X as long as the fastening allowance is small. Accordingly, when the fastening allowance is too small, the reaction force of the main lip 31 can be sufficiently increased at the time of high rotation to ensure the sealing performance of the bearing seal 26.

According to the present embodiment, in the fastening allowance $C_{nom}$, which is a boundary value between the fastening allowance small region and the fastening allowance large region, as shown in FIG. 6, the axis O direction position of the center of gravity F coincides with the rotation center X and slightly tilts so as to be positioned to the axis O direction outside as the waist portion 29 goes toward the inner diameter side. Due to this, when the fastening allowance is appropriate, the lip reaction force gradually decreases as the rotation speed of the pulley bearing 21 increases. Accordingly, it is possible to reduce frictional heat generated at a sliding contact portion between the main lip 31 and the inner ring 22 at the time of high rotation.

Although not shown in the drawings, with respect to the axis O of the pulley bearing 21, it is preferable that the axis O direction thickness of the waist portion 29 is minimized on the outer diameter side. This makes it easy to set the rotation center X of the waist portion 29, the main lip 31, and the dust lip 32 to the outer diameter edge of the waist portion 29.

According to the present embodiment, as shown by the cross section in FIG. 4, the sectional shape at the axis O direction inner end portion 31r of the main lip 31 is rounded with a radius of 0.05 [mm] or more. Due to this, it is possible to suppress variation in the lip reaction force by which the main lip 31 presses the inner ring 22. The cross section of the inner end portion 31r may be an arc or a curved surface other than an arc.

The bearing seal 26 of the present embodiment is used for the pulley bearing 21 as shown in FIG. 1. This makes it possible to stabilize the sealing performance of the bearing seal 26 in a high-rotation pulley bearing in which the rotation speed of the pulley 10 may reach 20000 [rpm].

According to the bearing seal 26 of the present embodiment, the center of gravity F of the portion that includes the waist portion 29, the main lip 31, and the dust lip 32, and the rotation center X of the portion that includes the waist portion 29, the main lip 31, and the dust lip 32 are set so that the lip reaction force of the main lip 31 against the inner ring 22 increases due to the centrifugal force generated by rotation of the pulley bearing 21 in the relatively small fastening allowance $C_1$, and so that the lip reaction force of the main lip 31 against the inner ring 22 decreases due to the centrifugal force generated by rotation of the pulley bearing 21 in the relatively large fastening allowance $C_2$. Due to this, the position of the center of gravity F is designed to change according to the fastening allowance. Accordingly, even if the fastening allowance is insufficient or the fastening allowance is excessive, it is possible to cause the lip reaction force to converge into an appropriate range as the rotation speed of the pulley bearing 21 increases.

While an embodiment of this present invention has been described above with reference to the drawings, the present invention is not limited to the illustrated embodiment. Various modifications and variations can be made to the illustrated embodiment within the identical scope to the present invention or within an equivalent scope to the present invention.

REFERENCE SIGNS LIST 21 pulley bearing
22 fixed inner ring
23 rotating outer ring
29 waist portion
31 main lip (first lip)
32 dust lip (second lip).

The invention claimed is:
1. A bearing seal structure, comprising: a seal main body portion that is attached to a rotating outer ring of a bearing and covers an annular gap between the rotating outer ring and a fixed inner ring of the bearing; a waist portion that protrudes from an inner diameter edge of the seal main body portion to an inner diameter side and that is elastically deformable so as to tilt toward an axial direction; a first lip that protrudes from an inner diameter edge of the waist portion to an axial inside and that comes into contact with the fixed inner ring with a fastening allowance C; and a second lip that protrudes from the inner diameter edge of the waist portion to an axial outside, wherein:

in a bearing seal in which the first lip and the second lip are rotationally displaced about a rotation center that is positioned on an outer diameter side with respect to the first lip and the second lip according to the fastening allowance C, in a free state without the fastening allowance C, a center of gravity of a portion that includes the waist portion, the first lip, and the second lip is present in an axially inside with respect to the rotation center, and an axial distance A from the rotation center to the center of gravity is included in a range of more than 0 and less than the fastening allowance C.

2. The bearing seal structure according to claim 1, wherein the waist portion tilts so as to be positioned in the axial inside as the waist portion goes toward an inner diameter side in the free state.

3. The bearing seal structure according to claim 1, wherein with respect to an axis of the bearing, an axial thickness of the waist portion is smallest on an outer diameter side.

4. The bearing seal structure according to claim 1, wherein a sectional shape of the first lip at an axial inner end portion is rounded with a radius of 0.05 mm or more.

5. A pulley bearing, comprising the fixed inner ring, the rotating outer ring, a pulley main body fixed to the rotating outer ring, and the bearing seal structure according to claim 1.

6. A design method of a bearing seal, wherein in a bearing seal that includes:

a seal main body portion that is attached to an axial end portion of a rotating outer ring of a bearing and covers an annular gap between a fixed inner ring and the rotating outer ring of the bearing, a waist portion that protrudes from an inner diameter edge of the seal main body portion to an inner diameter side and is configured to elastically deform so as to tilt toward an axial outside when the bearing seal is fastened with a fastening allowance to an axial inside, a first lip that protrudes from an inner diameter edge of the waist portion to the axial inside and is configured to press an axial end portion of the fixed inner ring to the axial inside with a reaction force when the bearing seal is fastened with the fastening allowance, and a second lip that protrudes from the inner diameter edge of the waist portion to the axial outside, setting a center of gravity of a portion that includes the waist portion, the first lip, and the second lip, and a rotation center of a portion that includes the waist portion, the first lip, and the second lip so that:

the reaction force of the first lip against the fixed inner ring increases due to a centrifugal force generated by rotation of the bearing when the fastening allowance is relatively small, and the reaction force of the first lip against the fixed inner ring decreases due to a centrifugal force generated by rotation of the bearing when the fastening allowance is relatively large.

\* \* \* \* \*